US008433156B2

(12) United States Patent
Mishima et al.

(10) Patent No.: US 8,433,156 B2
(45) Date of Patent: Apr. 30, 2013

(54) INTERPOLATION FRAME GENERATING APPARATUS AND METHOD

(75) Inventors: Nao Mishima, Inagi (JP); Takuma Yamamoto, Fuchi (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 221 days.

(21) Appl. No.: 12/884,746

(22) Filed: Sep. 17, 2010

(65) Prior Publication Data

US 2011/0211111 A1     Sep. 1, 2011

(30) Foreign Application Priority Data

Mar. 1, 2010    (JP) ................... 2010-044435

(51) Int. Cl.
*G06K 9/46*     (2006.01)

(52) U.S. Cl.
USPC ...... 382/275; 382/236; 375/240; 375/240.16; 348/441

(58) Field of Classification Search .......... 348/402, 348/169; 514/91; 375/240
See application file for complete search history.

(56) References Cited

U.S. PATENT DOCUMENTS 7,440,619 B2   10/2008   Mishima et al. .............. 382/209

2006/0222077 A1   10/2006   Ohwaki et al. ........... 375/240.16
2008/0204592 A1*   8/2008   Jia et al. ..................... 348/402.1

FOREIGN PATENT DOCUMENTS

JP         2007-60192       3/2007

* cited by examiner

*Primary Examiner* — Jefferey Harold
*Assistant Examiner* — Sihar Karwan
(74) *Attorney, Agent, or Firm* — Ohlandt, Greeley, Ruggiero & Perle, L.L.P.

(57) ABSTRACT

According to one embodiment, an apparatus includes a motion estimation unit, a generating unit, a detection unit, and a filtering unit. The motion estimation unit is configured to estimate a first motion vector from a first reference frame to a second reference frame. The generating unit is configured to assign a first pixel value and a second motion vector to an interpolation frame. The detection unit is configured to detect an occlusion region in the interpolation frame. The filtering unit is configured to assign the second motion vector to the occlusion region as a third motion vector, calculate degrees of difference between second pixel values derived from the second motion vectors and third pixel values derived from the third motion vectors, and assign a fourth pixel value derived from a fourth motion vector to the occlusion region, wherein the fourth motion vector is calculated based on the degrees of difference.

6 Claims, 7 Drawing Sheets

INTERPOLATION FRAME GENERATING APPARATUS AND METHOD

CROSS-REFERENCE TO RELATED APPLICATIONS

This application is based upon and claims the benefit of priority from Japanese Patent Application No. 2010-044435, filed Mar. 1, 2010; the entire contents of which are incorporated herein by reference.

FIELD

Embodiments described herein relate generally to an apparatus and method for generating an interpolation frame interpolated between frames of a moving image.

BACKGROUND

A display apparatus, such as a liquid crystal display and electroluminescent display, includes an interpolation frame generating apparatus that interpolates an interpolation frame between the frames of a moving image and increases the number of frames per unit time in order to smoothly display the moving image. The interpolation frame generating apparatus generates an interpolation frame interpolated between frames based mainly on the correlation of successive two frames. In generating the interpolation frame, it is considered difficult to interpolate a pixel in an occlusion region occurred in the interpolation frame.

In JP-A 2007-60192 (KOKAI), disclosed is a method for determining a stationary region as a background region based on a plurality of frames of a moving image, generating and accumulating a background image based on the stationary region determined as the background region and using the accumulated background image for an occlusion region of an interpolation frame.

However, in the method disclosed in JP-A 2007-60192 (KOKAI), pixels can be interpolated with respect to the occlusion region occurred in the stationary region, but there occurs a problem that the above method cannot be applied to an occlusion region occurred in a motion region.

DETAILED DESCRIPTION

In general, according to one embodiment, an apparatus for generating an interpolation frame to be interpolated between first and second reference frames includes a motion estimation unit, a generating unit, a detection unit, and a filtering unit. The motion estimation unit is configured to estimate a first motion vector joining a first block in the first reference frame to a second block in the second reference frame. The generating unit is configured to assign a first pixel value and a second motion vector to a first position in the interpolation frame, wherein the first pixel value is calculated based on at least one of the first and second reference frames, and the first position is indicated by the first motion vector. The detection unit is configured to detect an occlusion region or a non-occlusion region in the interpolation frame. The filtering unit is configured to assign the second motion vector which is assigned to a neighboring pixel to the occlusion region as a third motion vector, calculate degrees of difference between second pixel values derived from the second motion vectors and third pixel values derived from the third motion vectors, and assign a fourth pixel value derived from a fourth motion vector to the occlusion region, wherein the fourth motion vector is calculated by weighted mean of the second motion vectors based on the degrees of difference.

Next, the interpolation frame generating apparatus and method according to various embodiments are explained with reference to the drawings as required.

In the embodiments, like reference numbers denote like elements, and duplication of explanation will be avoided.

(First Embodiment)

Figure 1:
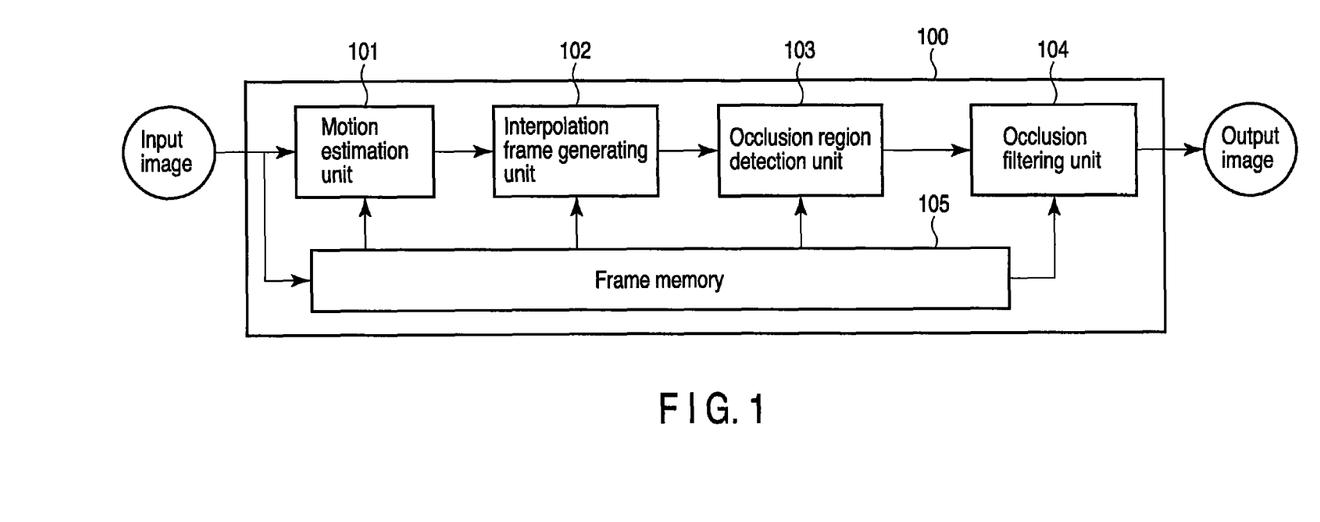
FIG. 1 is a diagram schematically showing an interpolation frame generating apparatus according to one embodiment.

FIG. 1 schematically shows an interpolation frame generating apparatus 100 according to a first embodiment. An image signal of a moving image (moving image signal) is input to a motion estimation unit 101 and a frame memory 105. The frame memory 105 temporarily stores the input image signal for each frame. As a result, the motion estimation unit 101, an interpolation frame generating unit 102, an occlusion region detection unit 103 and an occlusion filtering unit 104 can each refer to a plurality of frames at a time.

The interpolation frame generating apparatus 100 of FIG. 1 generates an interpolation frame interpolated between successive two reference frames (that is, that are adjacent in time) and interpolates the interpolation frame between the two reference frames. An image signal output from the interpolation frame generating apparatus 100 becomes a signal in which the number of frames per unit time is increased in comparison with that of the input image signal. For example, when the input image signal is a non-interlace signal (or progressive signal) of 60 Hz, the interpolation frame generating apparatus 100 interpolates a generated interpolation frame in a central position in time between successive reference frames and converts the above signal to a non-interlace signal of 120 Hz.

In the embodiment, a case wherein one interpolation frame is interpolated between successive two reference frames is explained as an example. The number of interpolation frames interpolated between the reference frames may be two or more. Further, the present embodiment can be applied without limiting the resolution, size and frame rate of an input moving image. Further, the two reference frames are not limited to an example of successive frames and may be frames only if the frames are displayed at different times.

Figure 2:
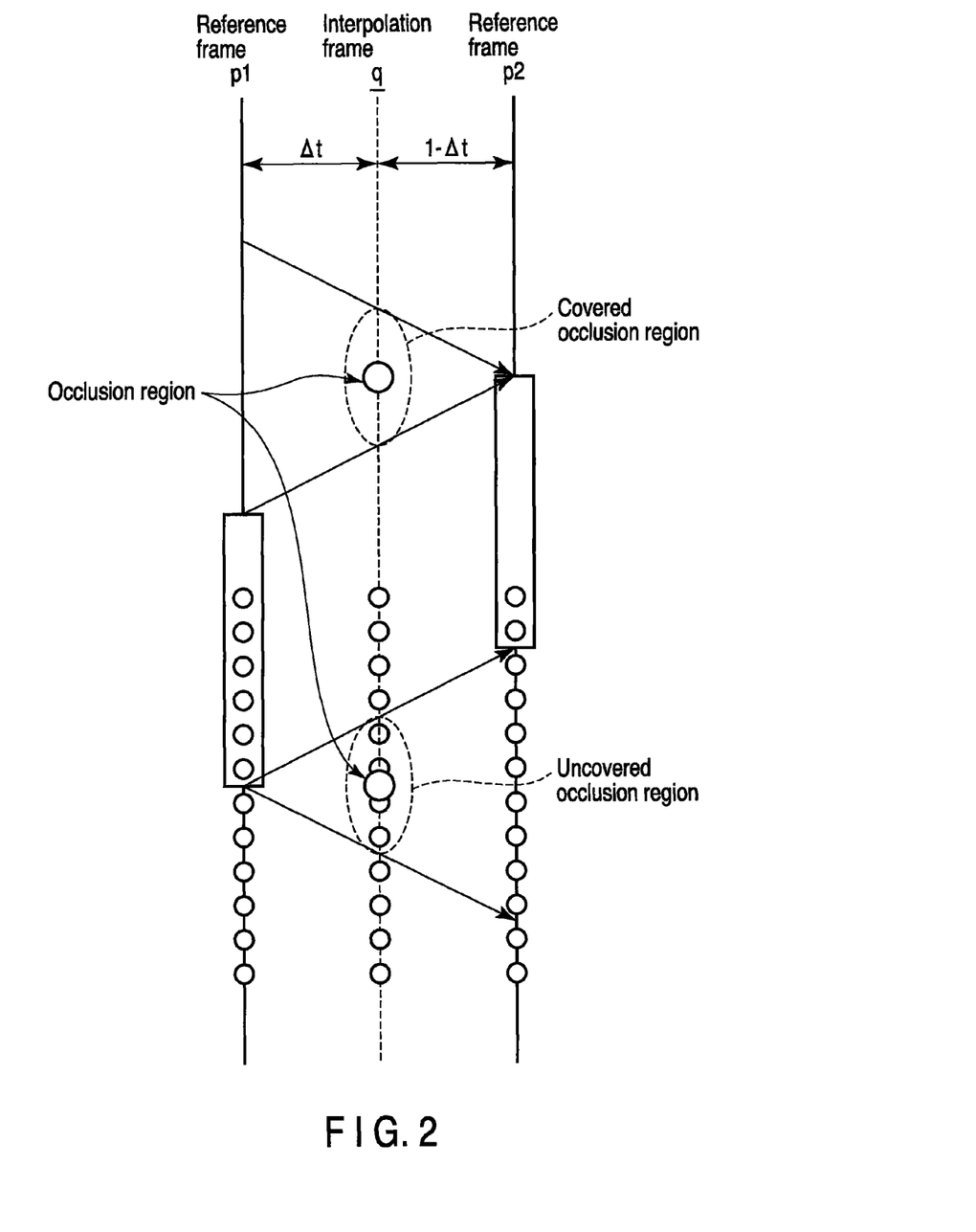
FIG. 2 is a diagram showing the relationship between an interpolation frame and reference frames.

In the embodiment, as shown in FIG. 2, it is assumed that two frames between which an interpolation frame q is interpolated are set to reference frames p1 and p2. Each frame is a two-dimensional image, but for simplifying the explanation, each frame is schematically shown as if it were a one-dimensional image in FIG. 2, FIG. 4, FIG. 5, FIG. 6 and FIG. 7. The reference frame p1 (that is also referred to as a first reference frame) is a frame at time t and the reference frame p2 (that is also referred to as a second reference frame) is a frame at time (t+1) that is successive to the reference frame p1. Further, the time position at which the interpolation frame q is interpolated is set to Δt. Time position Δt denotes a time interval between the reference frame p1 and the interpolation frame q with the time interval between the reference frames p1 and p2 set to 1. Therefore, the relationship of 0≦Δt≦1 is satisfied.

Further, the position of each pixel in the frame is indicated by a position (x, y). The first reference pixel value of position (x, y) in the reference frame p1 is set to $I_t(x, y)$ and the second reference pixel value of position (x, y) in the reference frame p2 is set to $I_{(t+1)}(x, y)$. The pixel value assigned to pixel position (x, y) in the interpolation frame is set to $I_{mc}(x, y)$. In the embodiment, the pixel values are indicated by the following equations as luminance values, that is, as scalar amounts, but vectors having information items of colors related to red, green and blue, for example, may be used as the pixel values.

In the frame interpolation process, a problem of occlusion (hidden surface) as described below occurs. In FIG. 2, shown is a case wherein an object moves upwardly from the reference frame p1 to the reference frame p2 and the background moves downwardly. When the object and background region thus move between the reference frames p1 and p2, an occlusion region occurs. The occlusion region used in this case indicates a region that occurs in the interpolation frame q and in which a region corresponding to only one of the two reference frames p1 and p2 between which the interpolation frame q is interpolated cannot be detected. The occlusion region occurs around the moving object as shown in FIG. 2, for example.

The occlusion region includes a covered occlusion region and an uncovered occlusion region. The covered occlusion region (that is also referred to as a first occlusion region) indicates one or more pixel positions in which corresponding pixels (or region) exist in the reference frame p1 but corresponding pixels (or region) do not exist in the reference frame p2. As one example, a covered occlusion region occurs when the background region existing in the reference frame p1 is hidden by an object in the reference frame p2 by movement of at least one of the object and background region.

The uncovered occlusion region indicates one or more pixel positions in which corresponding pixels (or region) exist in the reference frame p2 but corresponding pixels (or region) do not exist in the reference frame p1. As one example, an uncovered occlusion region occurs when the background region hidden behind the object in the reference frame p1 appears in the reference frame p2 by movement of at least one of the object and background region.

A region that lies on the interpolation frame and is different from the occlusion region is referred to as a non-occlusion region. Further, a region that lies on the reference frame p1 and in which a region corresponding to the reference frame p2 does not exist is similarly referred to as a covered occlusion region and a region that lies on the reference frame p2 and in which a region corresponding to the reference frame p1 does not exist is similarly referred to as an uncovered occlusion region.

In the frame interpolation process, a first motion vector from the reference frame p1 to the reference frame p2 is estimated based on the correlation between the reference frames p1 and p2 for each of pixels in the reference frame p1, and a pixel value is assigned to the interpolation frame q based on the estimated first motion vector. However, since a region corresponding to the occlusion region on the interpolation frame q exists in only one of the reference frames p1 and p2, it becomes difficult to properly interpolate pixel values based on the correlation between the reference frames p1 and p2. In the embodiment, there is provided a method for generating a high-quality interpolation frame by interpolating adequate pixel values with respect to an occlusion region on the interpolation frame q.

In FIG. 1, an input image signal is input to the motion estimation unit 101 and frame memory 105. The motion estimation unit 101 estimates a first motion vector from the reference frame p1, which is used as a reference, to the reference frame p2 for each of pixels in the reference frame p1. The interpolation frame generating unit 102 generates pixel values from at least one of the reference frames p1 and p2 for producing the interpolation frame q. The generated pixel values are assigned to pixel positions according to the first motion vectors estimated by the motion estimation unit 101, respectively. Then, the interpolation frame generating unit 102 assigns the first motion vectors to the first pixel positions as second motion vectors, respectively.

The occlusion region detection unit 103 detects an occlusion region occurred in the interpolation frame q generated by the interpolation frame generating unit 102. The occlusion filtering unit 104 filters the occlusion region, i.e., assigns motion vectors (fourth motion vectors that will be described later) and pixel values to pixel positions in the occlusion region detected by the occlusion region detection unit 103, respectively.

Figure 3:
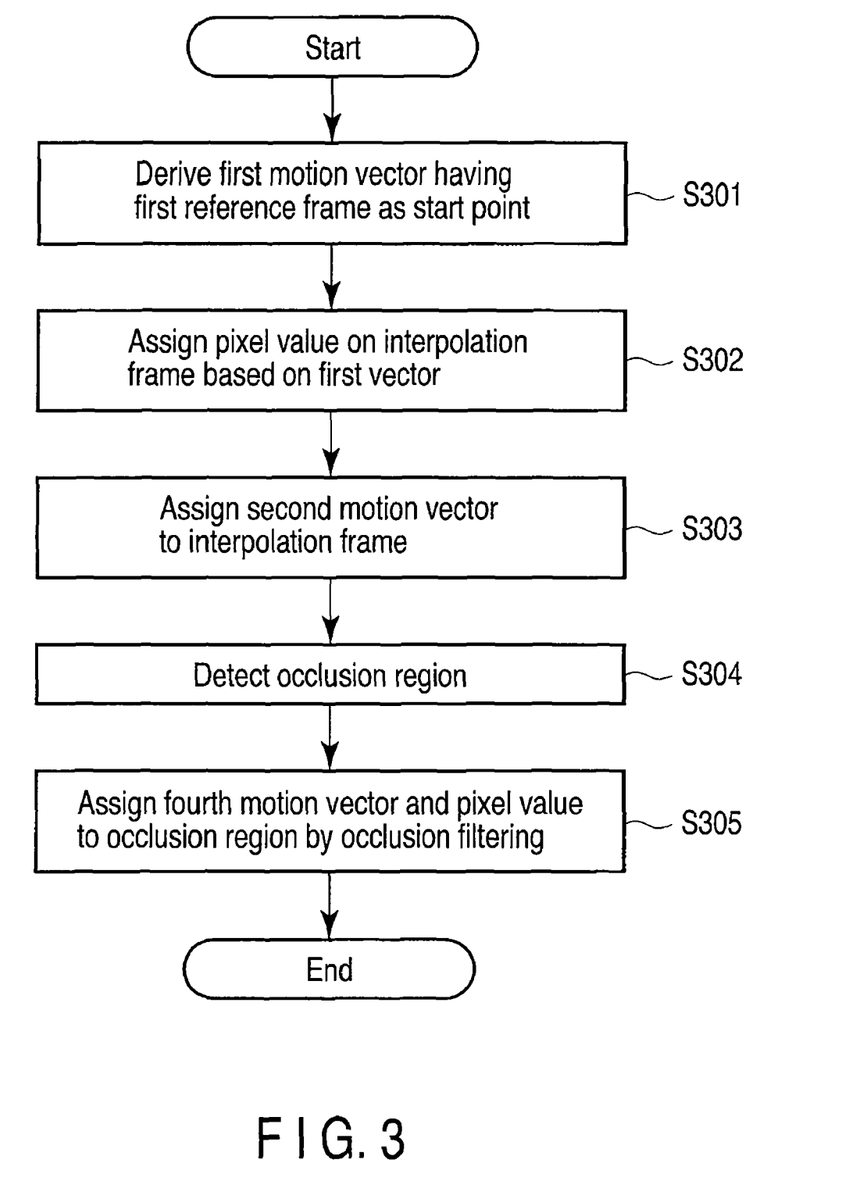
FIG. 3 is a flowchart schematically showing a process example for generating an interpolation frame by means of the interpolation frame generating apparatus of FIG. 1.

FIG. 3 shows one example of process for generating an interpolation frame q interpolated between the reference frames p1 and p2 by means of the interpolation frame generating apparatus 100.

First, as shown in step S301 of FIG. 3, the motion estimation unit 101 derives a first motion vector from the reference frame p1 to the reference frame p2 for each of pixels in the reference frame p1. For example, the motion estimation unit 101 derives a first motion vector by block matching as described below. In the embodiment, the first motion vectors are estimated by block matching, but the method is not limited to this case and the first motion vectors can be estimated by use of a method such as a gradient method.

In block matching, the reference frame p1 is divided into first blocks of a preset size. The first blocks are each set to a small rectangular region formed of $M_1$ pixels×$M_2$ pixels. The motion estimation unit 101 searches for second blocks in the reference frame p2 which have the highest correlation value with the respective first blocks. The motion estimation unit 101 derives a vector from the first block to the searched second block as a first motion vector for each of the first blocks. The first motion vector is a vector from the reference frame p1 to the reference frame p2. Further, the motion estimation unit 101 assigns the first motion vectors assigned to the first blocks to respective pixels in the first blocks.

For example, a motion vector u(i, j) assigned to the first block in position (i, j) is derived according to a block matching algorithm indicated by the following equation (1).

$$u(i, j) = \underset{-W \leq u_x \leq W, -W \leq u_y \leq W}{\operatorname{argmin}} MAD(i, j, t+1, u_x, u_y) \quad (1)$$

where W denotes a value used to set a motion searching range and $$\underset{-W \leq u_x \leq W, -W \leq u_y \leq W}{\operatorname{argmin}} E$$

denotes that a set of $u_x$, $u_y$ that makes the error function E minimum in a range specified by W is derived.

In equation (1), as the error function E, a mean absolute difference (MAD) with respect to the pixel values is used as indicated by the following equation (2).

$$MAD(i, j, t+1, u_x, u_y) = \frac{1}{M_1 M_2} \sum_{0 \le m < M_1, 0 \le n < M_2} |I_t(M_1 i + m, M_2 j + n) - I_{t+1}(M_1 i + m + u_x, M_2 j + n + u_y)| \quad (2)$$

Thus, the motion estimation unit 101 derives a set of $u_x$, $u_y$ that makes the error function minimum, i.e., a set of $u_x$, $u_y$ that indicates the second block having the largest correlation value with respect to the first block and assigns the derived set to the first block as a first motion vector.

The error function in equation (1) is not limited to the mean absolute difference indicated in equation (2) and may be satisfactory if it can be used to evaluate the magnitude of the correlation between the first and second blocks. For example, a mean square error may be used.

In the embodiment, it is assumed that the motion vector of each pixel in the first block is the same as the motion vector of the first block, that is, a first motion vector assigned to the first block is assigned to each pixel in the first block as indicated by the following expression (3).

$$u(x,y) \leftarrow u(i,j) \quad (3)$$

In this case, an arrow "←" indicates "assigning". Therefore, expression (3) indicates that the first motion vector assigned to the first block in position (i, j) is assigned to the pixel in position (x, y) in the block.

The interpolation frame generating apparatus 100 of FIG. 1 may utilize other motion vectors used for compression in a moving image coding process such as MPEG2, for example, without detecting first motion vectors by means of the motion estimation unit 101. In this case, the interpolation frame generating apparatus 100 can acquire first motion vectors by decoding an input image signal by means of a decoder (not shown).

Figure 4:
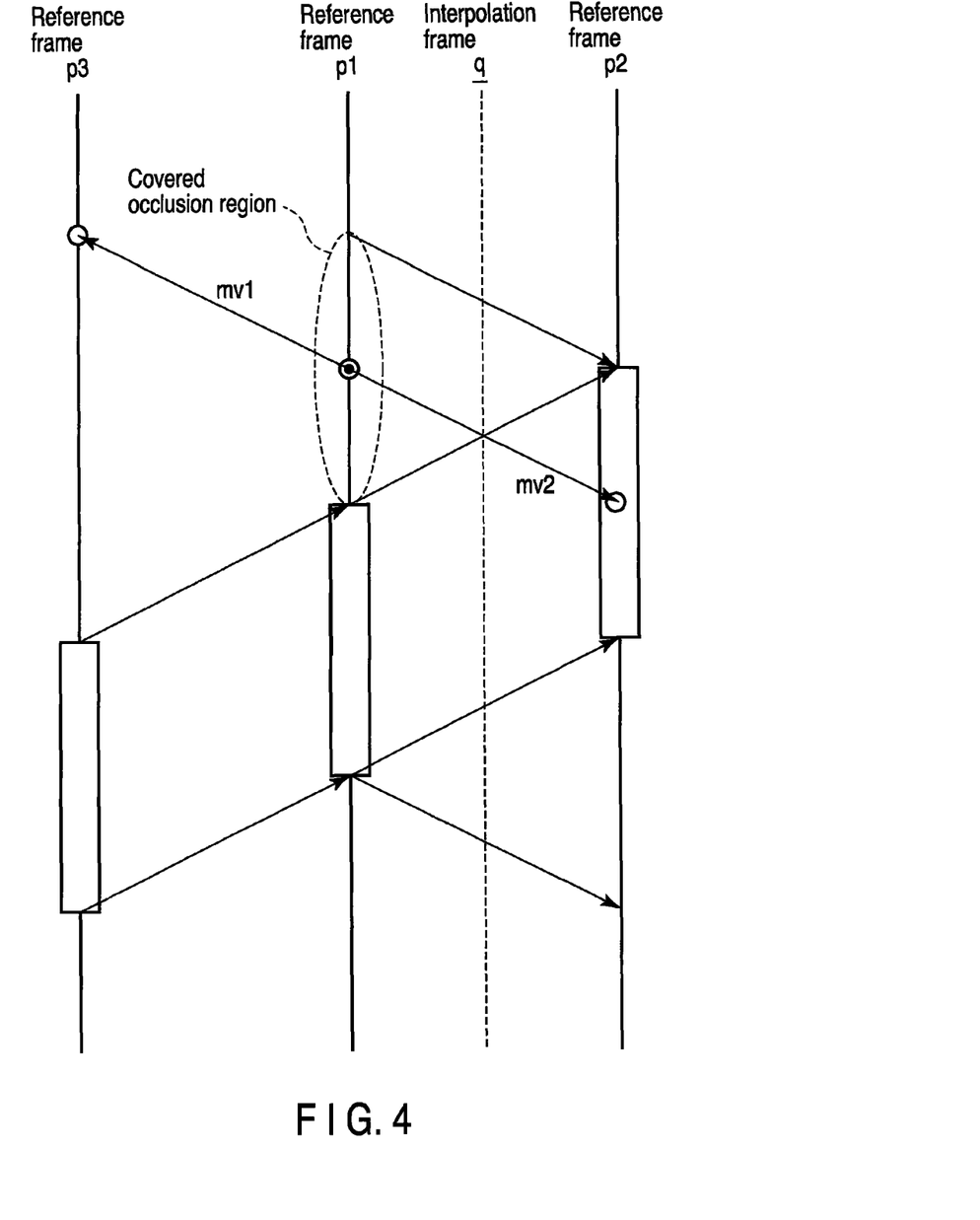
FIG. 4 is a diagram for illustrating a method for estimating a first motion vector.

As described above, the motion estimation unit 101 estimates a motion vector from the reference frame p1 to the reference frame p2 to each pixel in the reference frame p1. However, since a covered occlusion region on the reference frame p1 does not exist a corresponding region on the reference frame p2, the estimation result of the motion vector is distorted and, as a result, erroneous motion vectors may be assigned to the covered occlusion region on the reference frame p1. In order to avoid the above case, motion vectors may be assigned to the covered occlusion region on the reference frame p1 by block matching with a reference frame different from the reference frame p2. For example, as shown in FIG. 4, in the covered occlusion region on the reference frame p1, a corresponding region is not present on the reference frame p2 but a corresponding region exists on a succeeding reference frame p3 at time (t−1). The motion estimation unit 101 estimates a motion vector mv1 from the reference frame p1 to the reference frame p3 by block matching and derives a reverse vector of the estimated motion vector mv1 as a motion vector mv2 from the reference frame p1 to the reference frame p2. As a result, a correct motion vector can be assigned to the covered occlusion region on the reference frame p1.

In step S302 of FIG. 3, the interpolation frame generating unit 102 derives pixel values based on at least one of the first and second reference frames p1 and p2, and assigns the derived pixel values to first pixel positions, specified by the first motion vectors, in the interpolation frame q, respectively. The interpolation frame generating unit 102 then assigns the first motion vectors to the first pixel positions as a second motion vectors, respectively. Each of the second motion vectors has the first pixel position as a start point. A first reference pixel value $I_t$ is assigned to the pixel position in the interpolation frame q according to the first motion vector as shown in the following expression (4).

$$I_{mc}(x + \lfloor \Delta t u_x(x,y) \rfloor, y + \lfloor \Delta t u_y(x,y) \rfloor) \leftarrow I_t(x,y) \quad (4)$$

where $\lfloor x \rfloor$ denotes an operator to round x.

In the reference frames p1 and p2, it is assumed that pixels are arranged in positions in which respective components x and y of positions (x, y) are set to integral numbers and pixel values and motion vectors are assigned to pixel positions (x, y) in the interpolation frame q. Therefore, the pixel position indicated by the following expression (5) indicates a pixel position closest to the position, specified by the first motion vector $u=(u_x, u_y)$, in the interpolation frame q.

$$(x + \lfloor \Delta t u_x(x,y) \rfloor, y + \lfloor \Delta t u_y(x,y) \rfloor) \quad (5)$$

The interpolation frame generating unit 102 may assign pixel values calculated based on the reference frame p1, reference frame p2 or both of the reference frames p1 and p2 to pixel positions in the interpolation frame q, respectively. For example, as indicated by the following expression (6), a pixel value calculated by taking a weighted mean corresponding to time position Δt which the interpolation frame q is interpolated may be assigned to a pixel position in the interpolation frame q.

$$I_{mc}(x + \lfloor \Delta t u_x(x,y) \rfloor, y + \lfloor \Delta t u_y(x,y) \rfloor) \leftarrow (1-\Delta t) I_t(x,y) + \Delta t I_{t+1}(x + u_x(x,y), y + u_y(x,y)) \quad (6)$$

In step S303, the interpolation frame generating unit 102 assigns first motion vectors, which are assigned to the reference frame p1, to the interpolation frame q as second motion vectors, respectively, as indicated by the following expression (7). That is, the interpolation frame generating unit 102 assigns first motion vectors having the interpolation frame q as a start point as second motion vectors.

$$u_{mc}(x + \lfloor \Delta t u_x(x,y) \rfloor, y + \lfloor \Delta t u_y(x,y) \rfloor) \leftarrow u(x,y) \quad (7)$$

In this case, respective vectors $u_{mc}(x, y)$ of the interpolation frame q are previously initialized as indicated by the following expression (8).

$$u_{mc}(x,y) \leftarrow \text{NULL} \quad (8)$$

where NULL means that a value is not yet assigned.

The interpolation frame generating unit 102 may generate a second motion vector from the interpolation frame q to the reference frame p2 instead of that indicated by expression (7) by moving the start point to the position indicated by expression (5) in the interpolation frame q while the end point of the first motion vector assigned to the pixel in position (x, y) in the reference frame p1 is kept fixed on positions (x+$u_x$(x, y), y+$u_y$(x, y)) in the reference frame p2, instead of expression (7). That is, the interpolation frame generating unit 102 may generate the second motion vector as a motion vector with a magnitude corresponding to time interval (1−Δt) between the interpolation frame q and the reference frame p2.

Each of the second motion vectors may be assigned to the interpolation frame q in step S303 before a pixel value is assigned to the interpolation frame q in step S302. In this case, a pixel value derived from at least one on the first and second reference pixel values specified by the second motion vector is assigned to a pixel position in the interpolation frame q.

In step S304 of FIG. 3, the occlusion region detection unit 103 detects an occlusion region from the interpolation frame q generated in step S303. The uncovered occlusion region on the interpolation frame q coincides with a pixel position to which the second motion vector is not assigned. The occlusion region detection unit 103 detects position (x, y) that satisfies the following equation (9), that is, position (x, y) to which the second motion vector is not assigned as an uncovered occlusion region.

$$u_{mc}(x,y) = \text{NULL} \tag{9}$$

Figure 5:
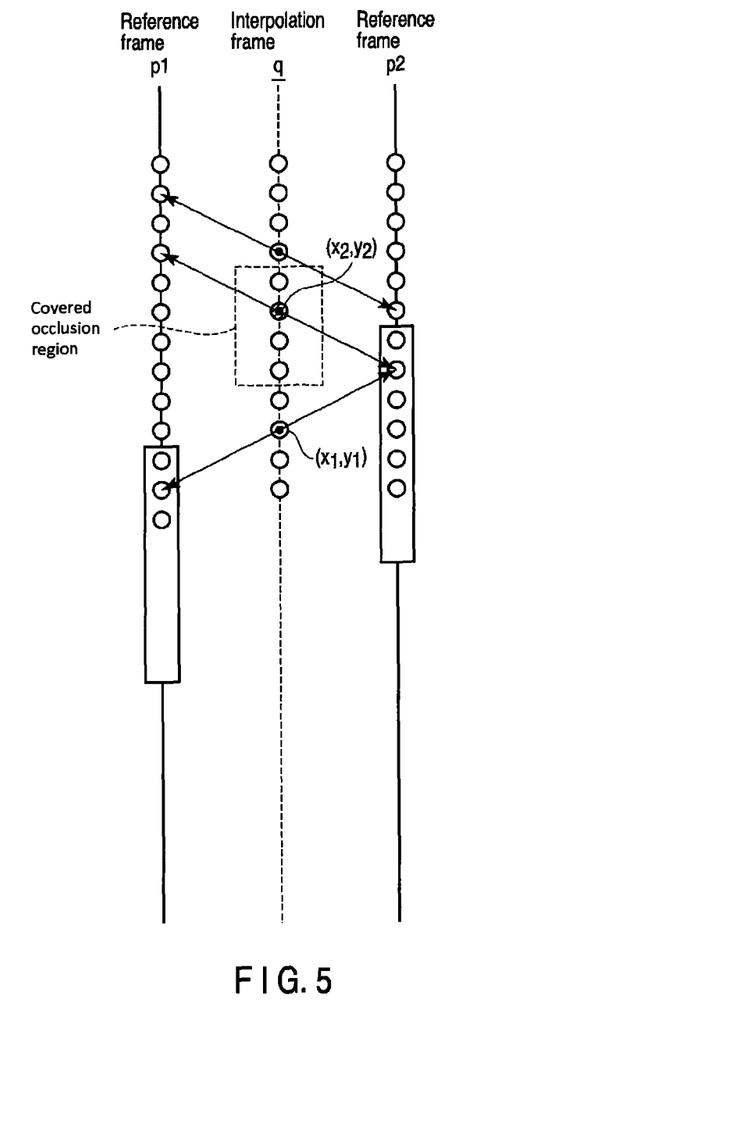
FIG. 5 is a diagram for illustrating a method for detecting a covered occlusion region.

Next, a method for detecting a covered occlusion region on the interpolation frame q is explained. In the process of detecting a covered occlusion region on the interpolation frame q, pixel positions $(x_1, y_1)$, $(x_2, y_2)$ in the interpolation frame q that satisfy the following equation (10) are first detected. That is, as shown in FIG. 5, pixel positions $(x_1, y_1)$, $(x_2, y_2)$ in the interpolation frame q are detected so that a pixel in the second reference frame p2 indicated by the second motion vector assigned to pixel position $(x_1, y_1)$ in the interpolation frame q will coincide with a pixel in the second reference frame p2 indicated by the second motion vector assigned to the other pixel position $(x_2, y_2)$ in the interpolation frame q.

$$\begin{bmatrix} x_1 + \lfloor u_x(x_1, y_1) \rfloor \\ y_1 + \lfloor u_y(x_1, y_1) \rfloor \end{bmatrix} = \begin{bmatrix} x_2 + \lfloor u_x(x_2, y_2) \rfloor \\ y_2 + \lfloor u_y(x_2, y_2) \rfloor \end{bmatrix} \tag{10}$$

Then, pixel difference values (that are also referred to as degrees of difference) d1, d2 between a pixel, specified by a reversed second motion vector, in the reference frame p1 and a pixel, specified by the second motion vector, in the reference frame p2 are calculated as the following equation (11).

$$d_1 = |I_t(x_1 - \lfloor \Delta t u_x(x_1, y_1) \rfloor, y_1 - \lfloor \Delta t u_y(x_1, y_1) \rfloor) - I_{t+1}(x_1 + \lfloor (1 - \Delta t) u_x(x_1, y_1) \rfloor, y_1 + \lfloor (1 - \Delta t) u_y(x_1, y_1) \rfloor)|$$

$$d_2 = |I_t(x_2 - \lfloor \Delta t u_x(x_2, y_2) \rfloor, y_2 - \lfloor \Delta t u_y(x_2, y_2) \rfloor) - I_{t+1}(x_2 + \lfloor (1 - \Delta t) u_x(x_2, y_2) \rfloor, y_2 + \lfloor (1 - \Delta t) u_y(x_2, y_2) \rfloor)| \tag{11}$$

In the case of $d1 \geq d2$, pixel position (x1, y1) in the interpolation frame q is determined as a covered occlusion region, and in the case of $d1 < d2$, pixel position (x2, y2) in the interpolation frame q is determined as a covered occlusion region. The pixel value and second motion vector assigned are removed from the pixel position determined as the covered occlusion region.

Figure 6:
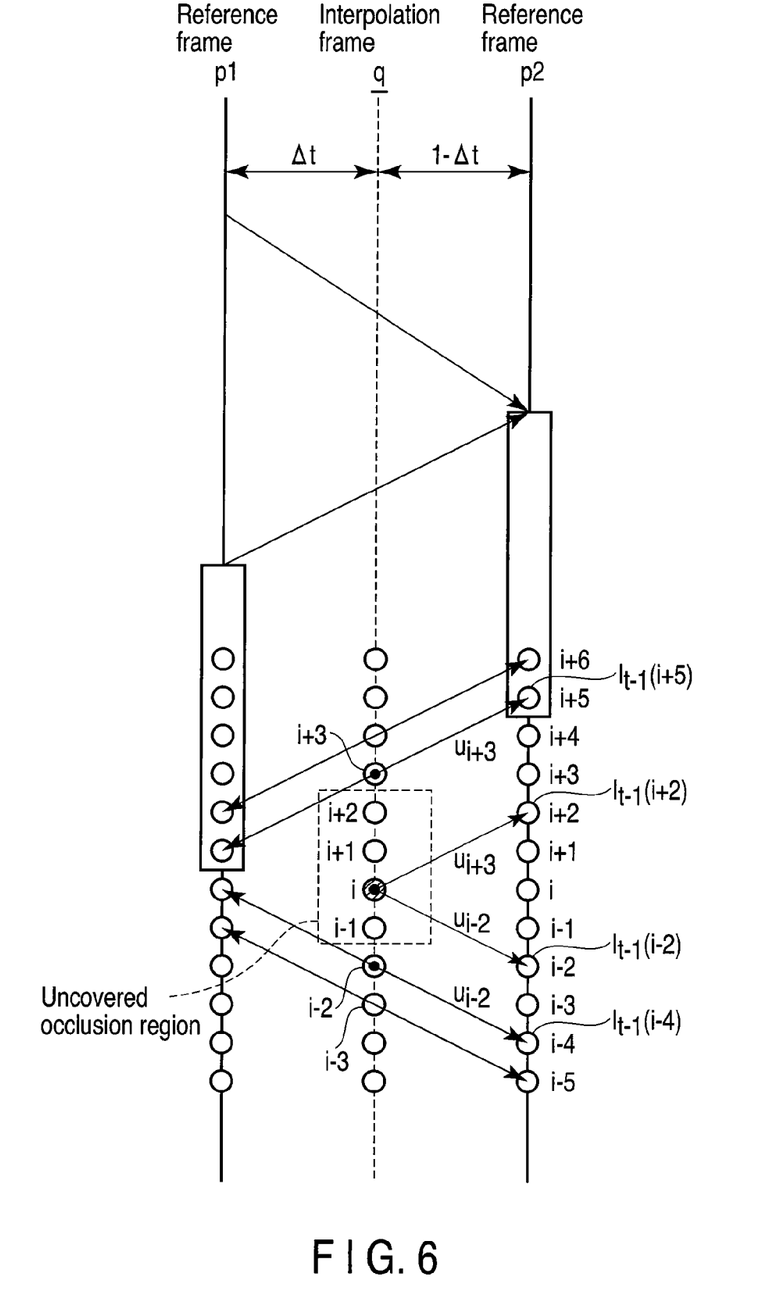
FIG. 6 is a diagram for illustrating an occlusion filtering process.

In step S305, the occlusion filtering unit 104 interpolates a pixel by filtering with respect to each pixel in the occlusion region detected in step S304. It is considered that the occlusion region is a region successive to one of the adjacent regions, for example, one of the regions of the object and background region. For the covered occlusion region, as shown in FIG. 6, pixel difference values between the pixels in the reference frame p2 are calculated, and which one of the degrees of continuity of the occlusion region of the interpolation frame q with the object and background region is higher is determined based on the calculated pixel difference values.

The concept of occlusion filtering in step S305 is specifically explained with reference to FIG. 6. In FIG. 6, pixel positions (i−1) through (i+2) in the interpolation frame q are present in an uncovered occlusion regions and the second motion vector is not assigned thereto. A second motion vector $u_{i+3}$ is assigned to position (i+3) that is a non-occlusion region in the interpolation frame q and indicates position (i+2) in the reference frame p2. Further, a second motion vector $u_{i-2}$ is assigned to position (i−2) of the non-occlusion region and indicates position (i−4) in the reference frame p2.

A case wherein the second motion vector and pixel value are assigned to position i in the interpolation frame q is considered as an example. First, if the second motion vector $u_{i+3}$ is assigned to position i in the interpolation frame q as a third motion vector, the third motion vector $u_{i+3}$ indicates position (i+2) in the reference frame p2. A pixel difference value $d_{i+3}$ between positions (i+2) and (i+5) in the reference frame p2 is set to $d_{i+3} = |I_{t+1}(i+5) - I_{t+1}(i+2)|$. Further, if the second motion vector $u_{i-2}$ is assigned to position i in the interpolation frame q as a third motion vector, the third motion vector $u_{i-2}$ indicates position (i−2) in the reference frame p2. A pixel difference value $d_{i-2}$ between positions (i−2) and (i−4) in the reference frame p2 is set to $d_{i-2} = |I_{t+1}(i-4) - I_{t+1}(i-2)|$. If the pixel difference values $d_{i+3}$ and $d_{i-2}$ are compared and the pixel difference value $d_{i-2}$ is smaller, the degree of continuity of position i in the interpolation frame q with position (i−2) in the interpolation frame q is determined to be high. The occlusion filtering unit 104 assigns the second motion vector $u_{i-2}$ to position i in the interpolation frame q as a fourth motion vector and further assigns a pixel value $I_{t+1}(i-2)$ thereto, according to the determination of the continuity.

As will be described later, the occlusion filtering unit 104 of the embodiment assigns a vector calculated by weighted mean of the second motion vectors $u_{i+3}$, $u_{i-2}$ based on the pixel difference values $d_{i+3}$ and $d_{i-2}$ to pixel position i in the interpolation frame q as a fourth motion vector. In this case, the weight is set to weight w indicated by the fourth equation in the following equations (12), for example, so as to set the weight smaller as the pixel difference value becomes larger.

Figure 7:
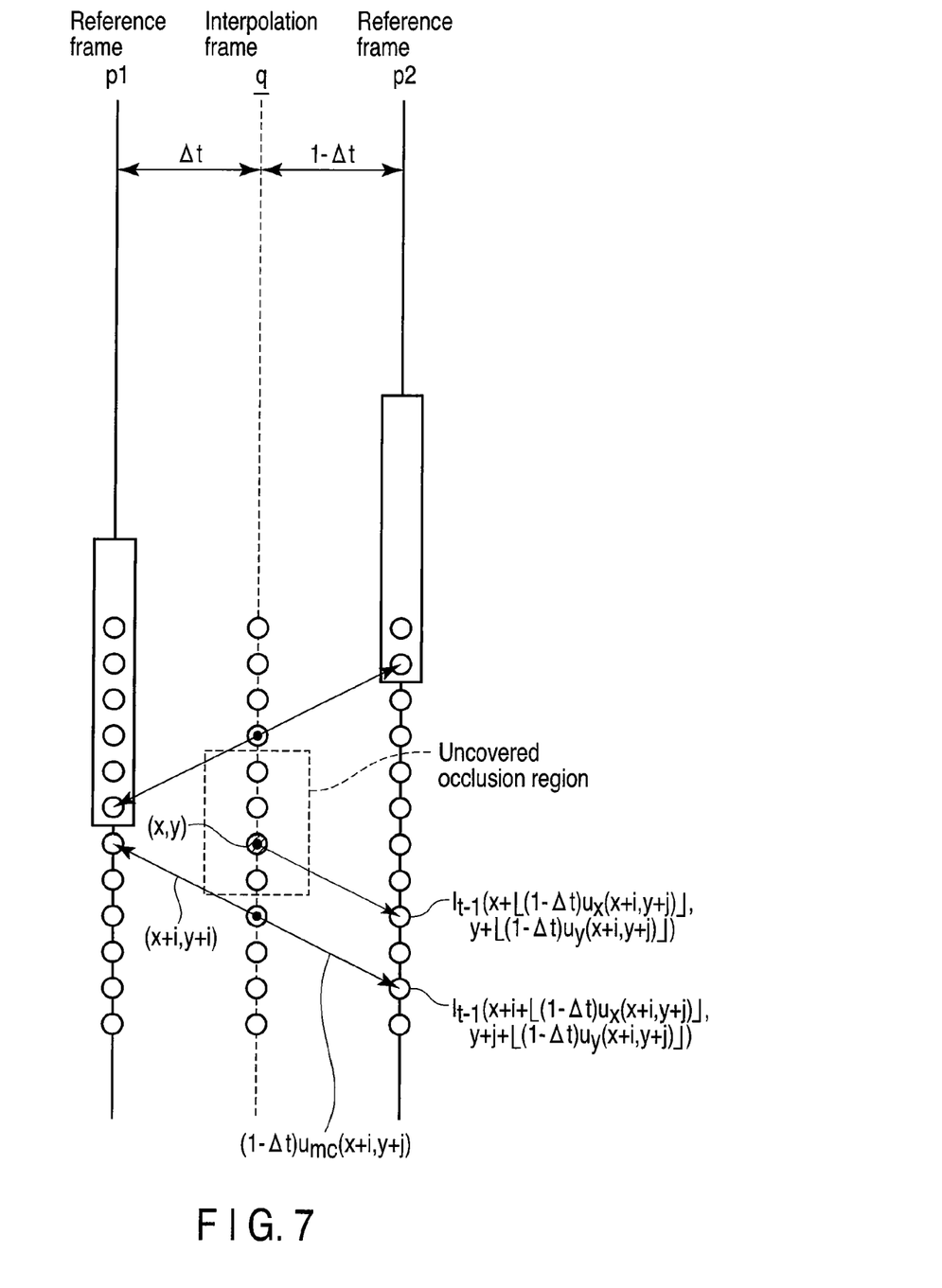
FIG. 7 is a diagram for illustrating an occlusion filtering process.

As shown in FIG. 7, if pixel position (x, y) in the interpolation frame q is an uncovered occlusion region, the occlusion filtering unit 104 derives a fourth motion vector to be assigned to the uncovered occlusion region as indicated by the following equations (12).

$$u_{mc}(x, y) = \frac{1}{Q} \sum_{-N \leq i \leq N, -N \leq j \leq N} w_o(x+i, y+j) \tag{12}$$

$$w(x, y, i, j, u_x(x+i, y+j), u_y(x+i, y+j)) u_{mc}(x+i, y+j)$$

$$Q = \sum_{-N \leq i \leq N, -N \leq j \leq N} w_o(x+i, y+j) w(x, y, i, j, u_x(x+y), u_y(x, y))$$

$$w_o(x, y) = \begin{cases} 0 & \text{if } (x, y) \text{ is a pixel position in the occlusion region} \\ 1 & \text{otherwise,} \end{cases}$$

$$w(x, y, i, j, u_x, u_y) =$$

$$\exp\left(-\frac{(I_{t+1}(x + \lfloor (1-\Delta t)u_x \rfloor + i, y + \lfloor (1-\Delta t)u_y \rfloor + j) - I_{t+1}(x + \lfloor (1-\Delta t)u_x \rfloor, y + \lfloor (1-\Delta t)u_y \rfloor))^2}{2\sigma^2}\right)$$

where $u_{mc}(x, y) = (u_x(x, y), u_y(x, y))^T$ and N indicates the width of filtering (i.e., a searching range). The superscript "T" indicates transposition. Further, σ indicates a parameter used to evaluate the degree of continuity of pixels. It is not determined that pixels are continuous if the difference value is not sufficiently small when the parameter is set to a small value. Further, it is determined that pixels are continuous even if the difference value is large when the parameter is set to a large value. The fourth equation in equations (12) is used to evaluate the degree of continuity. Further, the third equation in equations (12) is used to determine whether a to-be-filtered region is an occlusion region or not and an attempt is made so as not to use the motion vector (containing NULL) of the occlusion region for calculation.

The occlusion filtering unit 104 may search for one of second motion vectors assigned to the pixels in a preset range that has the largest weight w as indicated by the following equations (13) instead of equations (12) and assign the searched second motion vector to pixel position (x, y) as a fourth motion vector having the interpolation frame q as a start point.

$$u_{mc}(x, y) = \underset{-N \leq i \leq N, -N \leq j \leq N}{\mathrm{argmax}}\ w_o(x+i, y+j) \qquad (13)$$

$$w(x, y, i, j, u_x(x+i, y+j), u_y(x+i, y+j))$$

$$w_o(x, y) = \begin{cases} 0 & \text{if } (x, y) \text{ is a pixel position in the occlusion region} \\ 1 & \text{otherwise,} \end{cases}$$

$$w(x, y, i, j, u_x, u_y) =$$

$$\exp\left(-\frac{(I_{t+1}(x+\lfloor(1-\Delta t)u_x\rfloor+i, y+\lfloor(1-\Delta t)u_y\rfloor+j) - I_{t+1}(x+\lfloor(1-\Delta t)u_x\rfloor, y+\lfloor(1-\Delta t)u_y\rfloor))^2}{2\sigma^2}\right)$$

Next, a second reference pixel value indicated by the fourth motion vector derived by equations (12) is assigned to a pixel in the uncovered occlusion region as indicated by the following expression (14).

$$I_{mc}(x,y) \leftarrow I_{t+1}(x+\lfloor(1-\Delta t)u_{mc_x}(x,y)\rfloor, y+\lfloor(1-\Delta t)u_{mc_y}(x,y)\rfloor) \qquad (14)$$

For the covered occlusion region, the degree of continuity of the covered occlusion region with the surrounding regions thereof is determined by using a first reference pixel value specified by the reverse vector of the second motion vector. The occlusion filtering unit 104 subjects the covered occlusion region to the filtering process as indicated by the following equations (15) and assigns fourth motion vectors to the covered occlusion region.

$$u_{mc}(x, y) = \frac{1}{Q} \sum_{-N \leq i \leq N, -N \leq j \leq N} w_o(x+i, y+j) \qquad (15)$$

$$w(x, y, i, j, u_x(x+i, y+j), u_y(x+i, y+j))u_{mc}(x+i, y+j)$$

$$Q = \sum_{-N \leq i \leq N, -N \leq j \leq N} w_o(x+i, y+j)w(x, y, i, j, u_x(x, y), u_y(x, y))$$

$$w_o(x, y) = \begin{cases} 0 & \text{if } (x, y) \text{ is a pixel position in the occlusion region} \\ 1 & \text{otherwise,} \end{cases}$$

$$w(x, y, i, j, u_x, u_y) = \exp\left(-\frac{(I_t(x-\lfloor\Delta t u_x\rfloor+i, y-\lfloor\Delta t u_y\rfloor+j) - I_t(x-\lfloor\Delta t u_x\rfloor, y-\lfloor\Delta t u_y\rfloor))^2}{(2\sigma^2)}\right)$$

In this case, one of the second motion vectors that has the largest weight w may be selected as a fourth motion vector as in the case of equations (13).

A first reference pixel value specified by the reverse vector of the fourth motion vector derived in equations (15) is assigned to a pixel in the covered occlusion region as indicated by the following expression (16).

$$I_{mc}(x,y) \leftarrow I_t(x-\lfloor\Delta t u_{mc_x}(x,y)\rfloor, y-\lfloor\Delta t u_{mc_y}(x,y)\rfloor) \qquad (16)$$

The above filtering process may be sequentially performed in a pixel order while N is set to a sufficiently large value for pixels contained in the occlusion region or may be performed starting from the end portion of the occlusion region.

As described above, the interpolation frame generating apparatus 100 according to the first embodiment can assign adequate pixel values to the occlusion region occurring in the interpolation frame q and generate a high-quality interpolation frame.

(Second Embodiment)

An interpolation frame generating apparatus according to a second embodiment includes the same elements as that of the first embodiment shown in FIG. 1. Unlike the first embodiment, the second embodiment generates an interpolation frame interpolated between a first reference frame at time t and a second reference frame at time (t+1) using three or more reference frames.

In the embodiment, a motion estimation unit 101 estimates first motion vectors having the position of the first reference frame as a start point based on the correlation between the first and second reference frames and the correlations between the first reference frame and a plurality of third reference frames at times different from those of the first and second reference frames. As the third reference frames, frames lying between time (t−T) and time (t+T) are used. In this case, T indicates a natural number. Further, the pixel value of a reference frame at time (t−n) is set to $I_{t-n}(x, y)$ and the third reference pixel value of a third reference frame at time (t+n) is set to $I_{t+n}(x, y)$. In this case, n=1, 2, . . . , T.

If a first motion vector from the first reference frame to the second reference frame is set as a reference, it is necessary to multiply the first motion vector from the first reference frame to the third reference frame of time (t+n) by n and the first motion vector is normalized accordingly.

This embodiment can be realized by replacing the equations explained in steps S301 and S305 of FIG. 3 by the following equations.

With respect to step S301, equations (1) and (2) used to derive the first motion vector for respective blocks obtained by dividing the reference frame at time t are replaced by the following equations (17) and (18).

$$\begin{bmatrix} u(i, j) \\ n(i, j) \end{bmatrix} = \underset{-W \leq u_x \leq W, -W \leq u_y \leq W, -T \leq n \leq T}{\mathrm{argmin}}\ MAD(i, j, t, t+n, u_x, u_y) \qquad (17)$$

where n(i, j) indicates a time position of the reference frame and argmin E indicates $$-W \leq u_x \leq W, -W \leq u_y \leq W, -T \leq n \leq T$$

that a set of $u_x$, $u_y$, n which makes the error function E minimum is derived.

$$MAD(i, j, t, t+n, u_x, u_y) = \qquad (18)$$

$$\frac{1}{M_1 M_2} \sum_{0 \leq x < M_1, 0 \leq y < M_2} |I_t(M_1 i + x, M_2 j + y) - I_{t+n}(M_1 i + x + nu_x, M_2 j + y + nu_y)|$$

Further, the first motion vector assigned to the first block is assigned to each pixel in the first block as indicated by the following expression (19) instead of expression (4).

$$\begin{bmatrix} u(x, y) \\ n(x, y) \end{bmatrix} \leftarrow \begin{bmatrix} u(i, j) \\ n(i, j) \end{bmatrix} \qquad (19)$$

In the occlusion filtering process of step S305, equations (11) are replaced by the following equations (20) and a fourth motion vector to be assigned to an uncovered occlusion region is derived according to equations (20). As indicated by equations (20), in the uncovered occlusion region, the second reference frame and the third reference frame lying between time (t+2) and time (t+T) are used to determine the degree of continuity of the uncovered occlusion region with non-occlusion regions around the uncovered occlusion region.

$$u_{mc}(x, y) = \quad (20)$$

$$\frac{1}{Q} \sum_{-N \le i \le N, -N \le j \le N} w_O(x+i, y+j) w(x, y, i, j, u_x(x+i, y+j),$$

$$u_y(x+i, y+j), t, n(x+i, y+j)) u_{mc}(x+i, y+j)$$

$$Q = \sum_{-N \le i \le N, -N \le j \le N} w_O(x+i, y+j) w(x, y, i, j, u_x(x+i, y+j),$$

$$u_y(x+i, y+j), t, n(x+i, y+j))$$

$$w_O(x, y) = \begin{cases} 0 & \text{if } (x, y) \text{ is a pixel position in the occlusion region} \\ 1 & \text{otherwise,} \end{cases}$$

$$w(x, y, i, j, u_x, u_y, t, n) = \exp\left(-\frac{(I_{t+n}(x+\lfloor u'_x \rfloor + i, y + \lfloor u'_y \rfloor + j) - I_{t+n}(x+\lfloor u'_x \rfloor, y+\lfloor u'_y \rfloor))^2}{2\sigma^2}\right)$$

$$u'_x = (1 - \Delta t)u_x + (1-n)u_x$$

$$u'_y = (1 - \Delta t)u_y + (1-n)u_y$$

Further, expression (14) used to assign the pixel value to the pixel position in the uncovered occlusion region is replaced by the following expression (21).

$$I_{mc}(x,y) \leftarrow I_{t-n}(x+\lfloor (1-\Delta t)u_{mc_x}(x,y)+(n-1)u_{mc_x}(x,y) \rfloor, y+\lfloor (1-\Delta t)u_{mc_y}(x,y)+(n-1)u_{mc_y}(x,y) \rfloor) \quad (21)$$

A pixel value and fourth motion vector are assigned to the covered occlusion region by use of the same manner as that of the first embodiment.

As described above, in the interpolation frame generating apparatus according to the second embodiment, a high-quality interpolation frame can be generated by assigning pixel values to the interpolation frame based on the correlation between the first and second reference frames and the correlation between the first reference frame and at least one third reference frame.

According to the embodiments as described herein, adequate pixel values can be assigned to the occlusion region occurred in the interpolation frame, therefore a high-quality interpolation frame can be generated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for generating an interpolation frame to be interpolated between first and second reference frames of a moving image, comprising:
    a motion estimation unit configured to estimate a first motion vector joining a first block in the first reference frame to a second block in the second reference frame;
    a generating unit configured to assign a first pixel value and a second motion vector to a first position in the interpolation frame, wherein the first pixel value is calculated based on at least one of the first or second reference frames, and the first position is indicated by the first motion vector;
    a detection unit configured to detect an occlusion region or a non-occlusion region in the interpolation frame; and
    a filtering unit configured to assign the second motion vector which is assigned to a neighboring pixel to the occlusion region as a third motion vector, calculate degrees of difference between second pixel values derived from the second motion vectors and third pixel values derived from the third motion vectors, and assign a fourth pixel value derived from a fourth motion vector to the occlusion region, wherein the fourth motion vector is calculated by weighted mean of the second motion vectors based on the degrees of difference.

2. The apparatus according to claim 1, wherein the filtering unit is configured to assign a third motion vector having the smallest degree of difference to the occlusion region as the fourth motion vector.

3. The apparatus according to claim 1, wherein the filtering unit is configured to perform the weighted mean by using weight that becomes smaller as the degree of difference becomes larger.

4. The apparatus according to claim 1, wherein the detection unit is configured to detect a region to which pixel values is not assigned as the occlusion region.

5. The apparatus according to claim 4, wherein the detection unit is configured to derive first and second pixel difference values, which indicate a difference value between a pixel value assigned to a second pixel position included in the interpolation frame and a pixel value specified by second motion vector assigned to the second pixel position and a difference value between a pixel value assigned to a third pixel position included in the interpolation frame and a pixel value specified by second motion vector assigned to the third pixel position, respectively, and detect one of the second and third pixel positions which has a larger one of the first and second pixel difference values as the occlusion region, when second motion vectors assigned to the second and third pixel positions specify the same pixel in the second reference frame.

6. A method for generating an interpolation frame to be interpolated between first and second reference frames of a moving image, comprising:
    estimating a first motion vector joining a first block in the first reference frame to a second block in the second reference frame;
    assigning a first pixel value and a second motion vector to a first position in the interpolation frame, wherein the first pixel value is calculated based on at least one of the first and second reference frames, and the first position is indicated by the first motion vector;
    detecting an occlusion region or a non-occlusion region in the interpolation frame;
    assigning the second motion vector which is assigned to a neighboring pixel to the occlusion region as a third motion vector;
    calculating degrees of difference between second pixel values derived from the second motion vectors and third pixel values derived from the third motion vectors; and
    assigning a fourth pixel value derived from a fourth motion vector to the occlusion region, wherein the fourth motion vector is calculated by weighted mean of the second motion vectors based on the degrees of difference.

* * * * *